(12) United States Patent
Shimizu et al.

(10) Patent No.: US 10,563,380 B2
(45) Date of Patent: Feb. 18, 2020

(54) WORKING ARM OR A CONSTRUCTION MACHINE HAVING ANGLE DETECTION (71) Applicant: Caterpillar SARL, Geneva (CH)

(72) Inventors: Kunitomo Shimizu, Tokyo (JP); Hirokazu Koga, Tokyo (JP); Shuichi Takada, Tokyo (JP); Kenji Yokohata, Tokyo (JP); Yusuke Kimura, Tokyo (JP)

(73) Assignee: Caterpillar SARL, Geneva (CH)

(*) Notice: Subject to any disclaimer, the term of this patent is extended or adjusted under 35 U.S.C. 154(b) by 117 days.

(21) Appl. No.: 15/735,098

(22) PCT Filed: Jun. 7, 2016

(86) PCT No.: PCT/EP2016/062849
§ 371 (c)(1),
(2) Date: Dec. 8, 2017

(87) PCT Pub. No.: WO2016/198376
PCT Pub. Date: Dec. 15, 2016

(65) Prior Publication Data
US 2018/0171595 A1 Jun. 21, 2018

(30) Foreign Application Priority Data
Jun. 10, 2015 (JP) ................................. 2015-117261
Oct. 2, 2015 (JP) ................................. 2015-196992

(51) Int. Cl.
E02F 9/26 (2006.01)
E02F 3/43 (2006.01)
(Continued)

(52) U.S. Cl.
CPC ................ E02F 9/26 (2013.01); E02F 3/437 (2013.01); E02F 9/006 (2013.01); E02F 9/2264 (2013.01); G01B 7/30 (2013.01)

(58) Field of Classification Search
CPC . E02F 9/29; E02F 9/006; E02F 9/2264; E02F 9/264; E02F 3/437; G01B 7/00; G01B 7/30
See application file for complete search history.

(56) References Cited

U.S. PATENT DOCUMENTS 3,017,046 A * 1/1962 Runci ................... E02F 3/3411
116/297
3,347,398 A * 10/1967 Smith ....................... E02F 3/30
414/694
(Continued)

FOREIGN PATENT DOCUMENTS

EP 2511678 A1 10/2012
FR 2671625 A1 7/1992
(Continued)

Primary Examiner — Jamie L McGowan (57) ABSTRACT

A front linkage for a construction machine which can uniquely calculate the rotation angle of the work tool relative to the arm and which can prevent the angle detection device from being damaged by contact with the soil during digging. The front linkage has an arm, a first link pivotally connected at one end to the front end side of the arm, and at the other end to one end of a second link, and a work tool which is pivotally connected to the other end of the second link and which is pivotally connected to the arm in a further front end side than the one end portion of the first link. The first link is positioned outward along the outer width of the side wall of the arm. An angle detecting device for detecting the rotation angle of the first link relative to the arm may comprise a magnet disposed on an inner surface of the first link and a magnetic detector disposed on the side wall outer surface of the arm.

10 Claims, 10 Drawing Sheets (51) Int. Cl.
  *E02F 9/00* (2006.01)
  *E02F 9/22* (2006.01)
  *G01B 7/30* (2006.01)

(56) References Cited

U.S. PATENT DOCUMENTS

| | | | | | |
|---|---|---|---|---|---|
| 3,463,335 | A | * | 8/1969 | Woolman | E02F 3/308 414/694 |
| 3,796,335 | A | * | 3/1974 | Smith | E02F 3/3408 116/303 |
| 3,800,425 | A | * | 4/1974 | Haynie | B66C 23/90 116/215 |
| 5,012,939 | A | * | 5/1991 | Pitman | B66C 23/90 212/231 |
| 5,627,467 | A | * | 5/1997 | Lee | E02F 9/2025 324/207.16 |
| 5,826,666 | A | * | 10/1998 | Tozawa | E02F 3/437 172/7 |
| 6,098,322 | A | * | 8/2000 | Tozawa | E02F 3/437 37/414 |
| 6,108,948 | A | * | 8/2000 | Tozawa | E02F 3/435 172/2 |
| 6,778,097 | B1 | * | 8/2004 | Kajita | E02F 3/437 340/12.5 |
| 7,430,983 | B2 | * | 10/2008 | Hicok | E02F 3/431 116/313 |
| 9,115,483 | B2 | * | 8/2015 | Sakuda | E02F 9/2271 |
| 9,650,755 | B2 | * | 5/2017 | Nomura | E02F 3/3677 |
| 9,783,962 | B1 | * | 10/2017 | Hitchcock | E02F 9/264 |
| 2013/0115034 | A1 | | 5/2013 | Subrt | |

FOREIGN PATENT DOCUMENTS

| | | | |
|---|---|---|---|
| JP | 01214623 A | * | 8/1989 |
| JP | 2000-054423 A | | 2/2000 |
| JP | 2003-119818 A | | 4/2003 |
| JP | 2010071018 | | 4/2010 |

* cited by examiner

WORKING ARM OR A CONSTRUCTION MACHINE HAVING ANGLE DETECTION

CROSS-REFERENCE TO RELATED APPLICATIONS

This application is a national phase application of International Patent Application No. PCT/EP2016/062849 filed Jun. 7, 2016, which claims priority to Japanese Patent Application No. 2015-117261 filed Jun. 10, 2015, both of which are incorporated by reference herein in their entireties for all purposes.

TECHNICAL FIELD

The present invention relates to a working arm device that is attached to a construction machine such as a hydraulic shovel.

BACKGROUND ART

With the recent development of computer aided construction, there has been more and more demand for, for example, precise detection of the position of a work tool of a construction machine in operation, i.e., a work tool that is attached in a rotatable manner to a tip of an arm of a hydraulic shovel. The position of the work tool of a hydraulic shovel is detected by, for example, detecting the angle of rotation of the work tool with respect to the arm. In this regard, a known system includes a construction machine that calculates the angle of rotation of a work tool with respect to an arm. In this construction machine, an angle detector for detecting the angle of rotation of a work tool cylinder with respect to the arm is disposed at the base end (the bottom side) of the work tool cylinder positioned away from the work tool. According to this construction machine, the angle of rotation of the work tool with respect to the arm is calculated from the angle detected by the angle detector, and, because the angle detector is positioned away from the work tool, the angle detector is prevented from being damaged through contact with earth and sand during excavation or the like.

Figure 12:
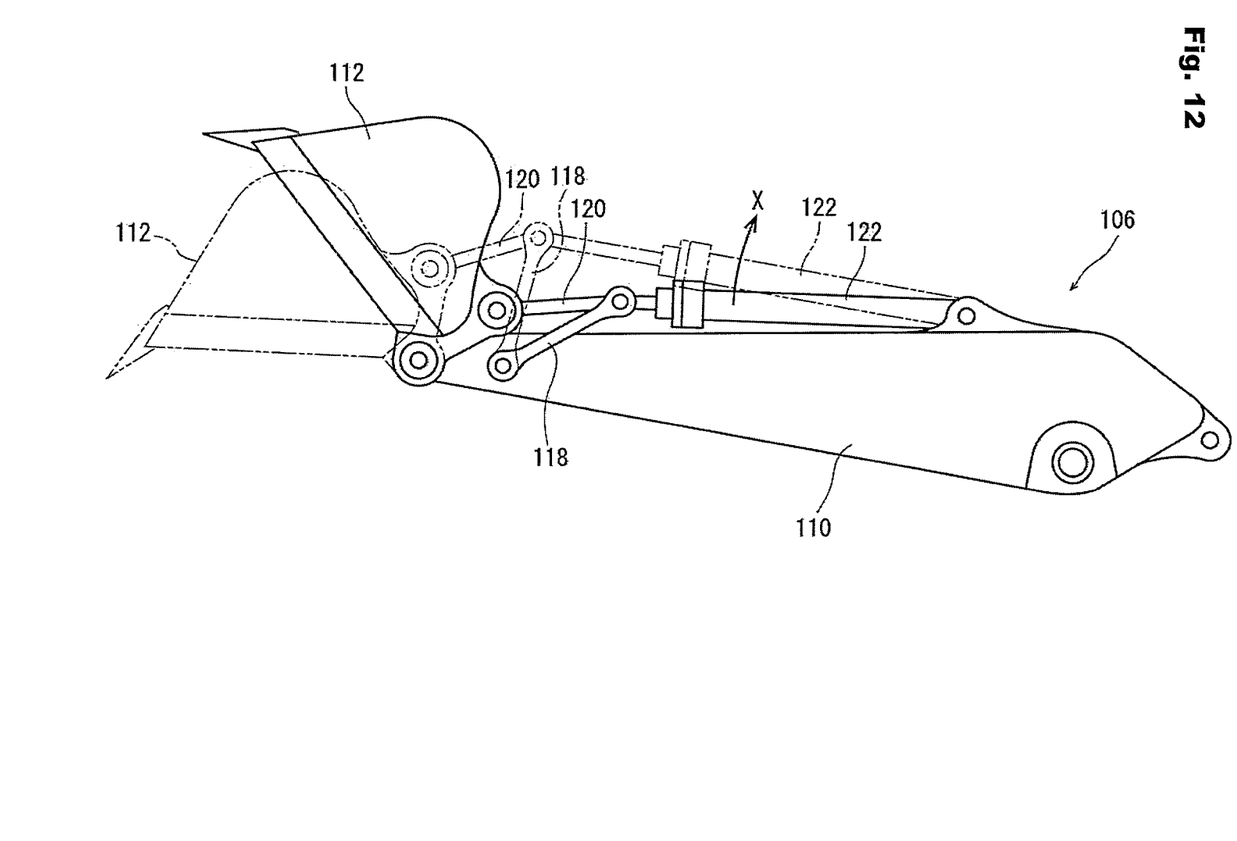
FIG. 12 is a side view of a working arm device in a state in which a work tool cylinder shown in FIG. 11 is the most retracted.
Figure 13:
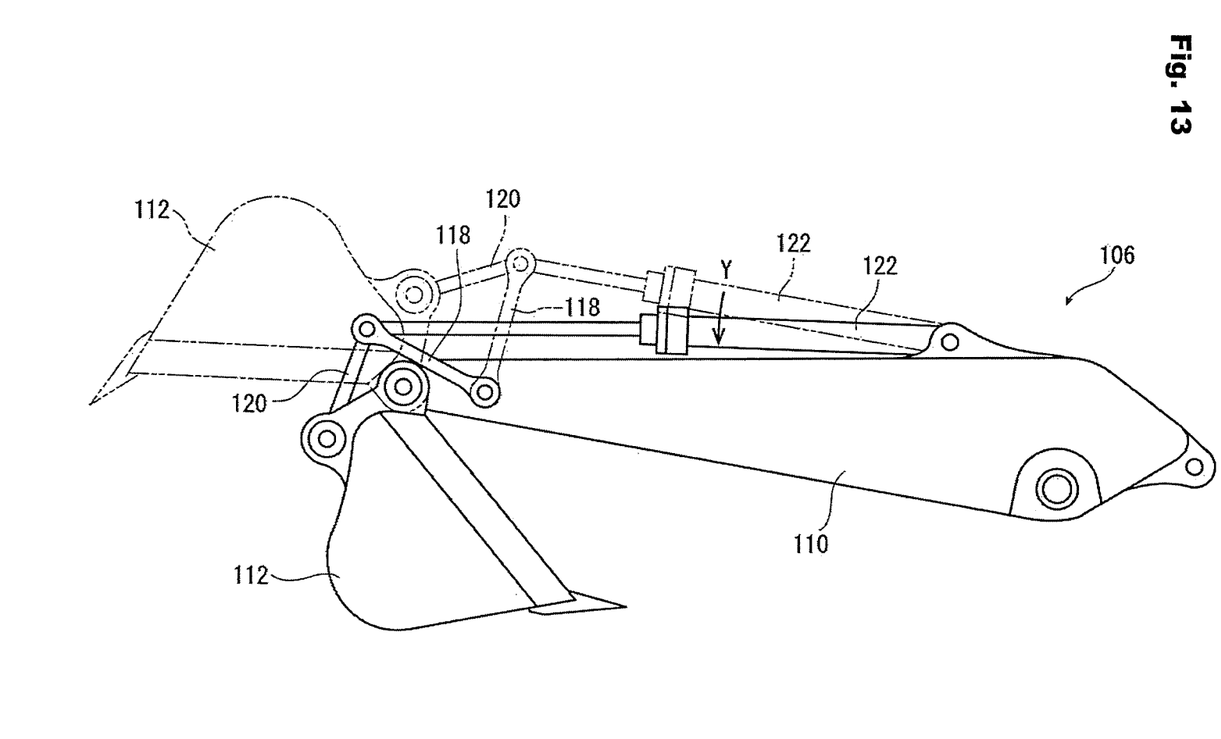
FIG. 13 is a side view of the working arm device in a state in which the work tool cylinder shown in FIG. 11 is the most elongated.

[The problem is further described with reference to FIG. 12 and FIG. 13. The] Conventionally, a work tool is positioned at a dump position when the work tool cylinder is the most retracted. On the other hand, the work tool is positioned at an excavation position when the work tool cylinder is the most elongated. [An operation of rotating the work tool cylinder 122 with respect to the arm 110 while the work tool 112 is rotated from the dump position to the excavation position is now described. First, as shown in FIG. 12, the work tool cylinder 122 is rotated from the position shown by the solid line to the position shown by the two-dot chain line, in the direction shown by the arrow X. Then, as shown in FIG. 13, the work tool cylinder 122 is rotated from the position shown by the two-dot chain line (same as the position shown by the two-dot chain line in FIG. 12) to the position shown by the solid line, in the direction shown by the arrow Y. Therefore, while] While the work tool is rotated in one direction from the discharge position to the excavation position, the work tool cylinder not only rotates in one direction but also rotates in the opposite direction thereafter. For this reason, it is difficult to unambiguously calculate the angle of rotation of the work tool with respect to the arm using only the angle of rotation of the work tool cylinder with respect to the arm.

The present invention was contrived in view of the foregoing circumstances, and the main technical object thereof is to provide a working arm device of a construction machine that is capable of not only unambiguously calculating the angle of rotation of a work tool with respect to an arm, but also preventing angle detection means from being damaged when in contact with, for example, earth and sand during excavation or the like.

As a working arm device of a construction machine that achieves the foregoing technical object, the present invention provides a working arm device of a construction machine, which has an arm, a first link that has one end portion coupled in a rotatable manner to a tip of the arm, a second link that has one end portion coupled in a rotatable manner to the other end portion of the first link, and a work tool that is coupled in a rotatable manner to the other end portion of the second link and is coupled in a rotatable manner to the arm so as to be positioned closer to the tip of the arm than the one end portion of the first link is, the first link being located widthwise outward of a side wall of the arm in a width direction, wherein angle detection means for detecting an angle of rotation of the first link with respect to the arm is disposed between an inner surface of the first link and an outer surface of the side wall of the arm.

It is preferred that the angle detection means is configured with a magnet attached to one of the inner surface of the first link and the outer surface of the side wall of the arm, and a magnetic detector attached to the other of the inner surface of the first link and the outer surface of the side wall of the arm. It is also preferred that the arm is provided with a cylindrical link coupling boss extending in the width direction and protruding from the side wall thereof, that a cylindrical link coupling pin is inserted in a rotatable manner into the link coupling boss, that the one end portion of the first link is fixed to the link coupling pin, and that the magnetic detector has an arc-shaped detecting element extending in the shape of an arc along an outer circumferential surface of the link coupling boss, the magnet being positioned between the outer circumferential surface of the link coupling boss and the arc-shaped detecting element. It is also preferred that the magnet is fixed to the inner surface of the first link, that the magnetic detector is fixed to a cover member, and that the cover member is attached to the outer surface of the side wall of the arm. It is preferred that the cover member is configured with a cover plate that is disposed at a distance from the outer surface of the side wall of the arm in the width direction, and that the magnetic detector is fixed to an inner surface of the cover plate. It is preferred that a through-hole is formed in the cover plate, that an inner circumferential rim of the through-hole has an arc-shaped inner circumferential rim extending in the shape of an arc along the arc-shaped detecting element of the magnetic detector, and that, with the magnetic detector being fixed to the inner surface of the cover plate, the arc-shaped detecting element of the magnetic detector projects toward the inside of the through-hole beyond the arc-shaped inner circumferential rim. The cover plate is preferably provided with a rib protruding widthwise inward from an outer circumferential rim of the cover plate and extending along the outer circumferential rim. It is preferred that the inner surface of the first link is provided with a pair of projections projecting widthwise inward, and that the magnet is positioned between the pair of projections in a circumferential direction of the link coupling pin. It is also preferred that the inner surface of the first link is provided with an annular ridge projecting widthwise inward, that a radial center of the annular ridge is positioned on a central axis line of the link coupling pin, and that the magnet is embedded in the annular ridge.

Advantageous Effects of Invention

According to the working arm device of a construction machine that is provided by the present invention, a link mechanism is configured by rotatably coupling the arm, the first link, the second link, and the work tool. Thus, because the first link is rotated in the same direction as the work tool with respect to the arm, the angle of rotation of the work tool with respect to the arm can be unambiguously calculated from the angle of rotation of the first link with respect to the arm that is detected by the angle detection means. Furthermore, disposed between the inner surface of the first link and the outer surface of the side wall of the arm, the angle detection means is covered by the first link. Therefore, the working arm device of a construction machine according to the present invention can prevent the angle detection means from being damaged when in contact with, for example, earth and sand during excavation or the like.

DESCRIPTION OF EMBODIMENTS

Embodiments of a working arm device of a construction machine according to the present invention are described hereinafter in detail by using a hydraulic shovel, a typical construction machine, as an example and with reference to the accompanying drawings.

Figure 1:
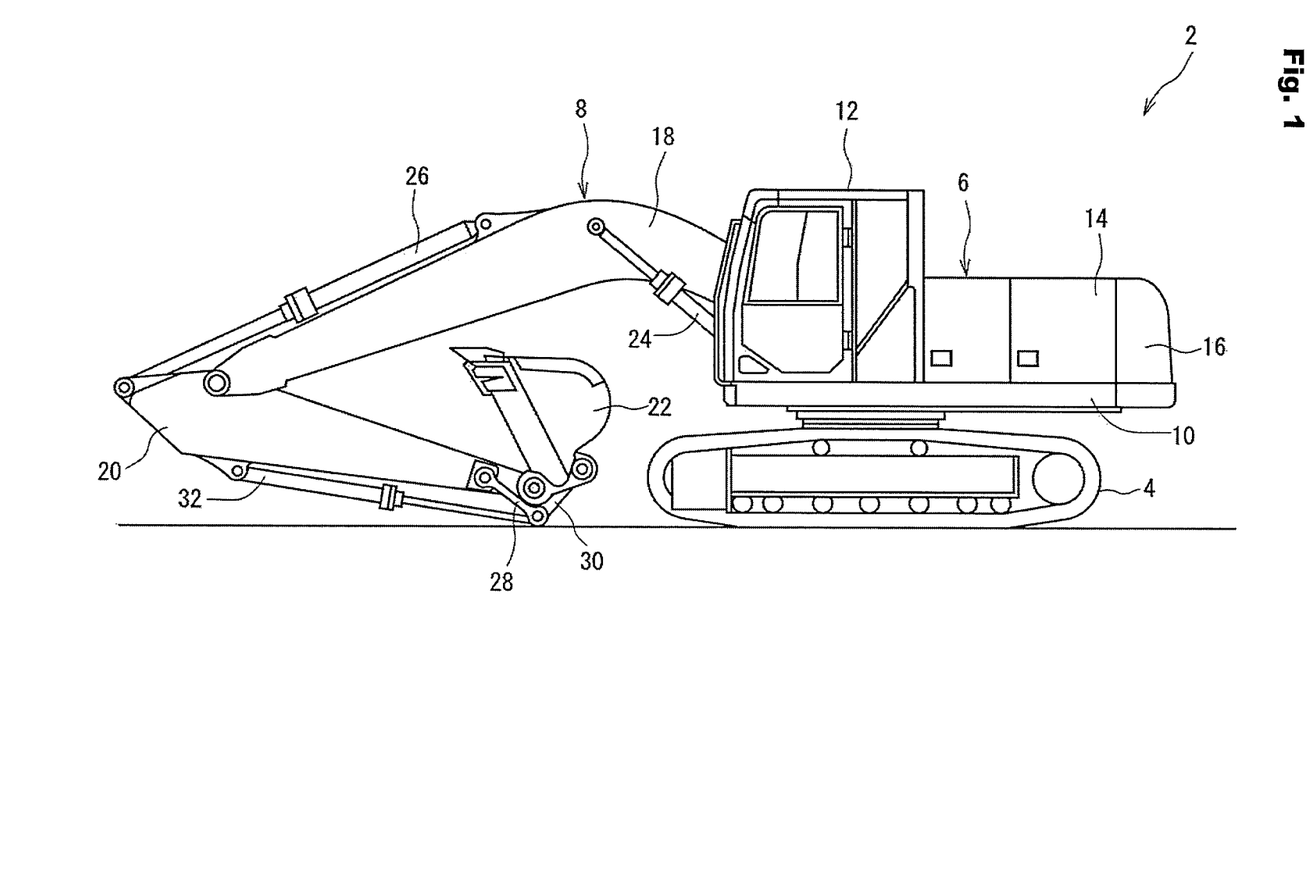
FIG. 1 is a side view of a hydraulic shovel provided with a working arm device configured according to the present invention.

The hydraulic shovel is now described with reference to FIG. 1. The hydraulic shovel, denoted by reference numeral 2, is configured roughly with a self-propelled lower traveling body 4, an upper slewing body 6 mounted in a slewable manner on the lower traveling body 4, and a working arm device 8 attached in a rotatable manner to the upper slewing body 6. On a slewing frame 10 constituting the framing structure of the upper slewing body 6 are disposed a cab 12 for boarding an operator, an equipment housing chamber 14 for housing various types of equipment such as the engine and a hydraulic pump, a counterweight 16 for balancing the load with respect to the working arm device 8, and the like. Such terms as "front-back direction" and "lateral direction (width direction)" used in the present specification are equivalent to the front-back direction and lateral direction (width direction) viewed from the operator boarded in the cab 12 shown in FIG. 1.

The working arm device 8 includes a boom 18 having the base end pin-connected in a rotatable manner to the front portion of the upper slewing body 6, an arm 20 having the base end pin-connected in a rotatable manner to a tip of the boom 18, a work tool 22 pin-connected in a rotatable manner to a tip of the arm 20, a pair of left and right boom cylinders 24 (only the left one is shown) for rotating the boom 18, an arm cylinder 26 for rotating the arm 20, and a work tool cylinder 32 for rotating the work tool 22 by means of a first link 28 and a second link 30. This hydraulic shovel 2 executes various operations such as excavation of earth and sand by rotating the boom 18, arm 20 and work tool 22 of the working arm device 8.

The hydraulic shovel is further described with reference to FIG. 2. The arm 20 has a pair of left and right side walls 34 (only the left one is shown) disposed at a distance from each other in the width direction, an upper wall 36 extending at the upper ends of the side walls 34 in FIG. 2, and a lower wall 38 extending at the lower ends of the side walls 34 in FIG. 2, and is shaped into a box. A plurality of cylindrical coupling bosses extending in the width direction and projecting widthwise outward from the outer surfaces of the side walls 34 are disposed in the arm 20. The coupling bosses include a boom coupling boss 40 disposed at the base end of the arm 20, a link coupling boss 42 disposed at a tip of the arm 20, and a work tool coupling boss 44 disposed on the arm 20 closer to the tip of the arm 20 than the link coupling boss 42 is. The arm 20 is pin-connected in a rotatable manner to the tip of the boom 18 by the boom coupling boss 40. In addition, the first link 28 is pin-connected in a rotatable manner to the arm 20 by the link coupling boss 42, and the work tool 22 is pin-connected in a rotatable manner to the same by the work tool coupling boss 44.

Figure 2:
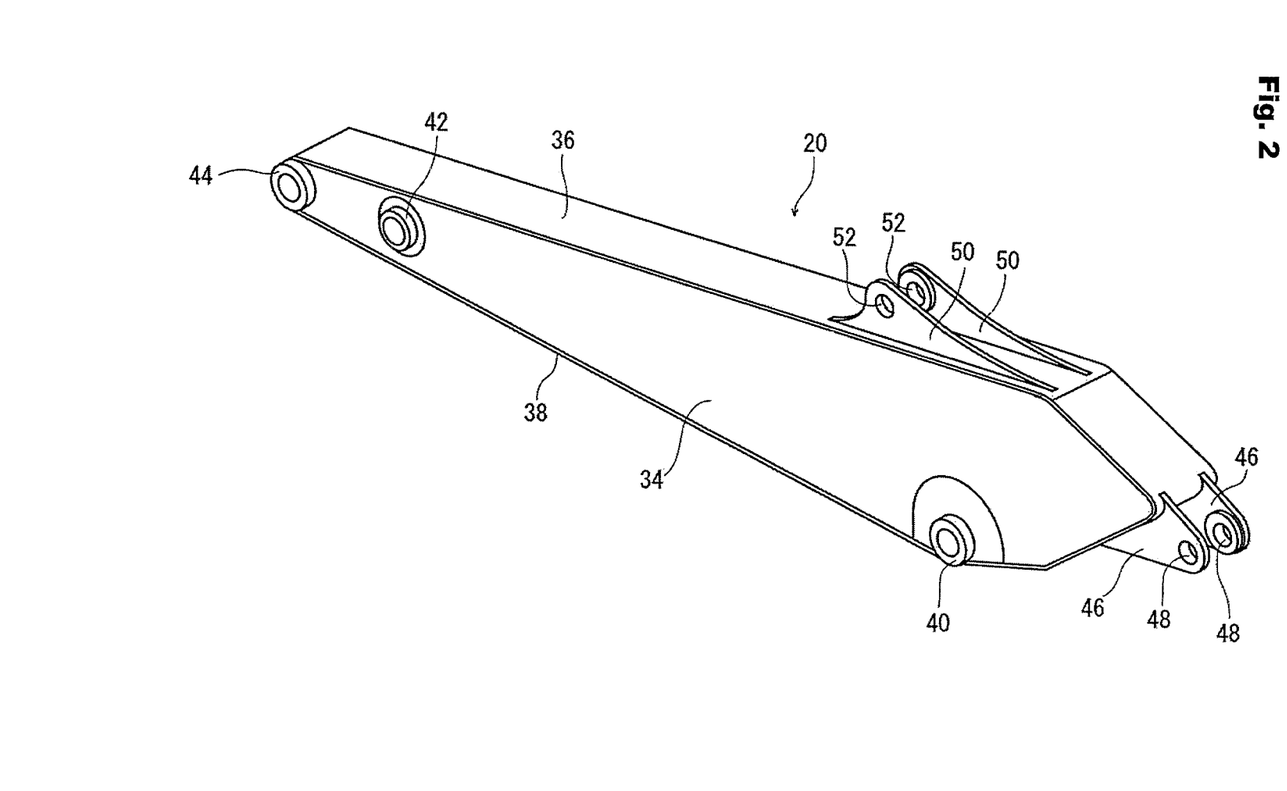
FIG. 2 is a perspective view of an arm shown in FIG. 1.

As shown in FIG. 2, on the lower wall 38, a pair of left and right arm cylinder brackets 46 is disposed at a distance from each other in the width direction, in such a manner as to project outward from the outer surface of the base end of the lower wall 38. A circular opening 48 is formed in each of the arm cylinder brackets 46. Furthermore, on the upper wall 36, a pair of left and right work tool cylinder brackets 50 is disposed at a distance from each other in the width direction, in such a manner as to project outward from the outer surface of the base end of the upper wall 36. A circular opening 52 is formed in each of the work tool cylinder brackets 50. The tip of the arm cylinder 26 (the rod side) is pin-connected in a rotatable manner to the arm 20 by the circular openings 48 of the arm cylinder brackets 46, and the base end of the work tool cylinder 32 (the bottom side) is pin-connected in a rotatable manner to the same by the circular openings 52 of the work tool cylinder brackets 50.

Figure 3:
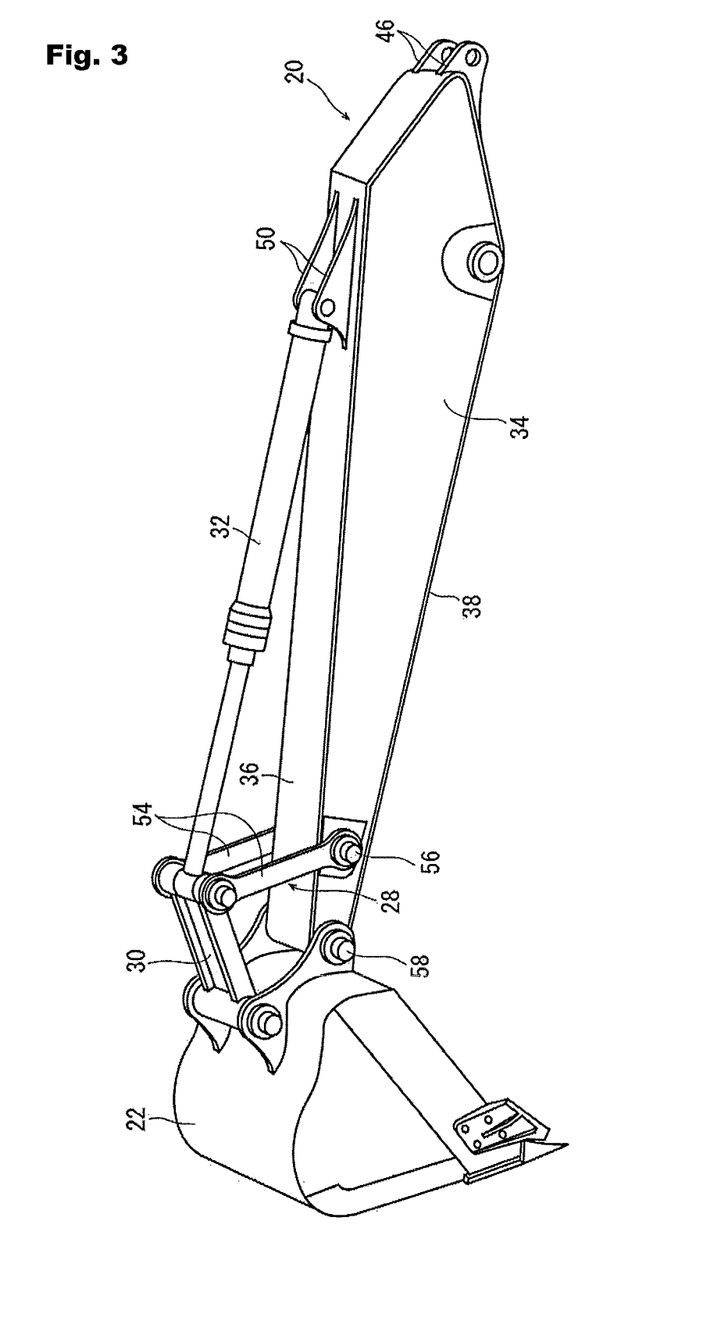
FIG. 3 is a perspective view of the working arm device shown in FIG. 1.

The hydraulic shovel is further described with reference to FIG. 2 and FIG. 3. In the illustrated embodiment, the first link 28 is configured with a pair of left and right link pieces 54 disposed widthwise outward of the respective side walls 34, as shown in FIG. 3. One end portion of each link piece 54 is fixed to an axial end portion of a cylindrical link coupling pin 56. The link coupling pin 56 is inserted in a rotatable manner into the link coupling boss 42. As shown in FIG. 3, the other end portion of each link piece 54 is pin-connected in a rotatable manner to the tip of the work tool cylinder 32 (the rod side) and one end portion of the second link 30. The work tool 22 is not only pin-connected in a rotatable manner to the other end portion of the second link 30 but also coupled in a rotatable manner to the arm 20 by a cylindrical work tool coupling pin 58 inserted into the work tool coupling boss 44. When the work tool cylinder 32 is elongated, the work tool 22, viewed from the left, is rotated counterclockwise about the central axis of the work tool coupling pin 58, and each of the link pieces 54, viewed from the left, is rotated counterclockwise about the central axis of the link coupling pin 56. When the work tool cylinder 32 is retracted, the work tool 22, viewed from the left, is rotated clockwise about the central axis of the work tool coupling pin 58, and each of the link pieces 54, viewed from the left, is rotated clockwise about the central axis of the link coupling pin 56. Therefore, the link pieces 54 rotate in the same direction as the work tool 22 in response to such telescopic motion of the work tool cylinder 32.

The hydraulic shovel is further described with reference to FIG. 4 to FIG. 7. An important thing to note in the working arm device 8 of the hydraulic shovel 2 configured according to the present invention is that angle detection means for detecting the angle of rotation of the link pieces 54 with respect to the arm 20 is disposed between an inner surface of each link piece 54 and an outer surface of each side wall 34. Since the link pieces 54 rotate in the same direction as the work tool 22 with respect to the arm 20 as described above, the angle of rotation of the work tool 22 with respect to the arm 20 is unambiguously calculated from the angle of rotation of the link pieces 54 with respect to the arm 20, which is detected by the angle detection means. Disposed between the inner surface of each link piece 54 and the outer surface of each side wall 34 of the arm 20, the angle detection means is covered by the link pieces 54. Therefore, the working arm device 8 according to the present invention can prevent the angle detection means from being damaged when in contact with, for example, earth and sand during excavation or the like.

Figure 5:
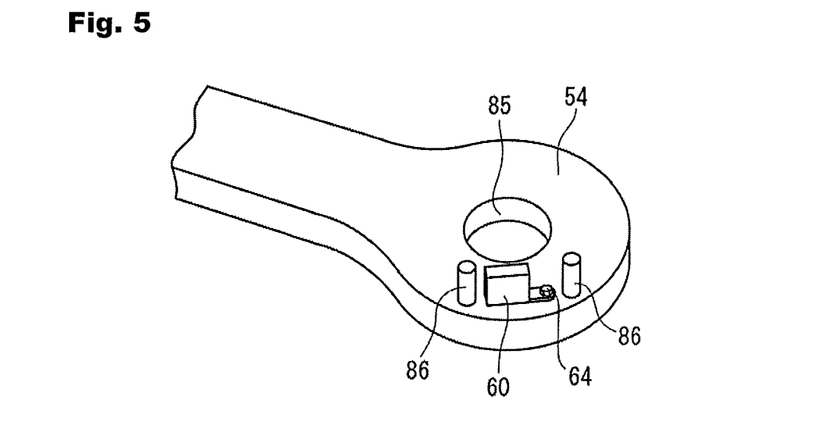
FIG. 5 is a perspective view of a left link piece shown in FIG. 4.
Figure 6:
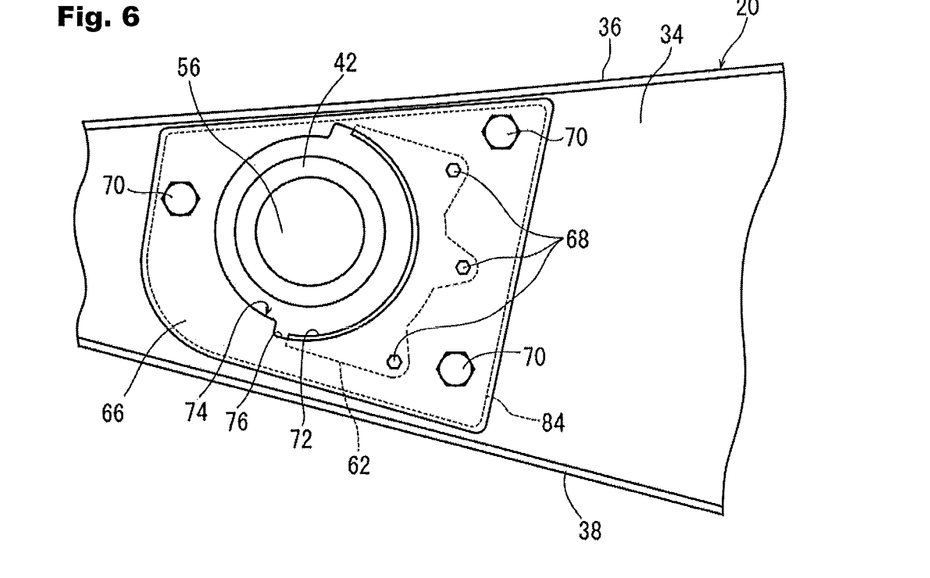
FIG. 6 is a side view of the arm in a state in which the link pieces are removed from the working arm device shown in FIG. 4.
Figure 7:
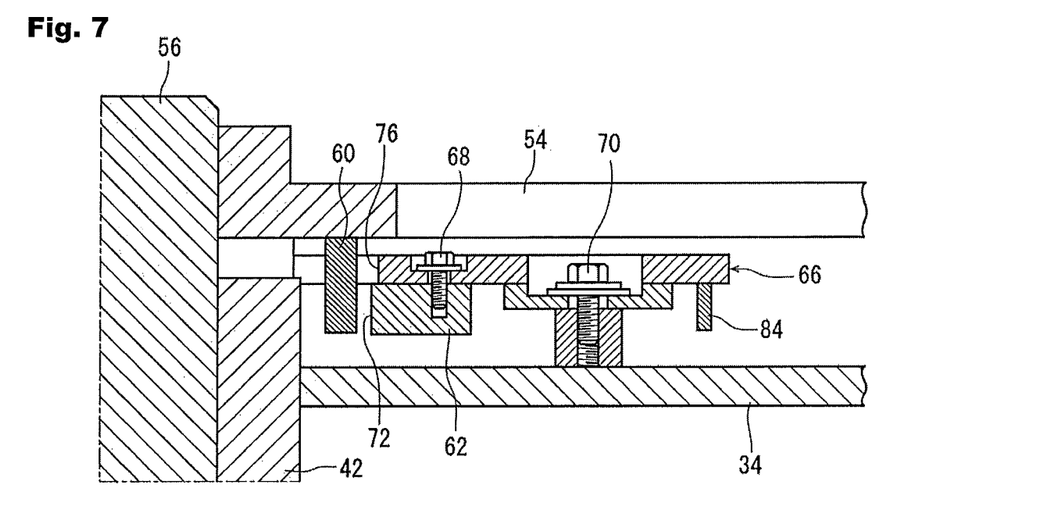
FIG. 7 is a cross-sectional diagram, taken along A-A direction of FIG. 4.

According to the illustrated embodiment, the angle detection means is configured with a magnet 60 and a magnetic detector 62. As shown in FIG. 5, the magnet 60 is fixed to the inner surface of the left link piece 54 by a bolt 64. The magnetic detector 62 is fixed to a cover member. It is preferred that the cover member is attached to the outer surface of the left side wall 34 of the arm 20. Therefore, compared to when the magnetic detector 62 is attached directly to the outer surface of the left side wall 34, the impact to be transmitted to the magnetic detector 62 during excavation or the like can be reduced more significantly. According to the illustrated embodiment, the cover member is configured with a cover plate 66 that is disposed at a distance from the outer surface of the left side wall 34 of the arm 20 in the width direction, as shown in FIG. 6 and FIG. 7. The magnetic detector 62 is fixed to an inner surface of the cover plate 66 by a bolt 68, and the cover plate 66 is fixed to the outer surface of the left side wall 34 of the arm 20 by a bolt 70. Contrary to the illustrated embodiment, the magnetic detector 62 may be attached to the inner surface of the left link piece 54 and the magnet 60 may be attached to the outer surface of the left side wall 34 of the arm 20. Alternatively, the magnet 60 and the magnetic detector 62 may be disposed on the right-hand side of the arm 20. In other words, the magnet 60 may be attached to one of the inner surface of the right link piece 54 and the outer surface of the right side wall 34 of the arm 20, and the magnetic detector 62 may be attached to the other of the inner surface of the right link piece 54 and the outer surface of the right side wall 34 of the arm 20.

Figure 4:
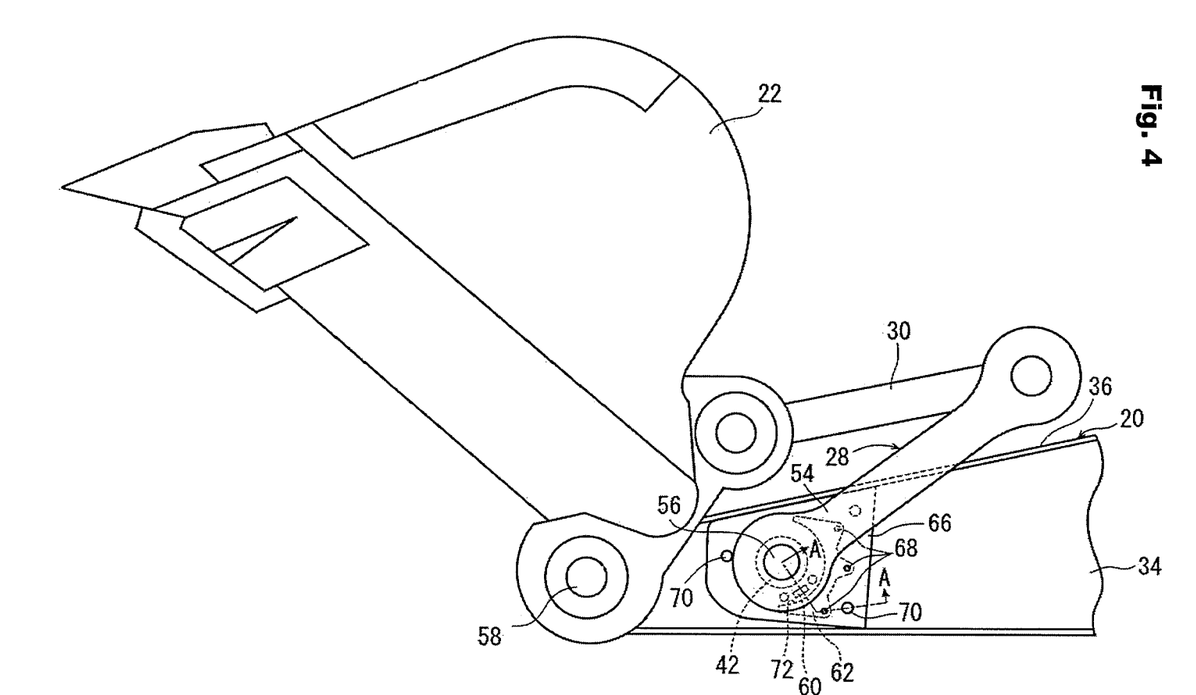
FIG. 4 is a side view of the working arm device shown in FIG. 1.

The magnetic detector 62, connected electrically to a chassis controller (not shown) wired or wirelessly, has an arc-shaped detecting element 72 extending in the shape of an arc along an outer circumferential surface of the link coupling boss 42, as can be understood by referring to FIG. 4 and FIG. 6. As shown in FIG. 4, the magnet 60 is preferably positioned between the outer circumferential surface of the link coupling boss 42 and the arc-shaped detecting element 72 of the magnetic detector 62. When the link pieces 54 are rotated together with the work tool 22 by the telescopic motion of the work tool cylinder 32 at the time of the execution of various operations such as excavation of earth and sand by the hydraulic shovel 2, the magnet 60 is moved along the arc between the outer circumferential surface of the link coupling boss 42 and the arc-shaped detecting element 72. For this reason, it is preferred that the detecting element 72 of the magnetic detector 62 is in the shape of an arc for the purpose of angle detection. The position of the magnet 60 is detected by the magnetic detector 62 and transmitted from the magnetic detector 62 to the controller. Then, from the transmitted position of the magnet 60, the controller calculates the angle of rotation of the link pieces 54 with respect to the arm 20, as well as the angle of rotation of the work tool 22 with respect to the arm 20.

It is preferred that the magnetic detector 62 is configured with an AMR (Anisotropic-Magneto-Resistive) sensor. Although generally Hall ICs are employed as magnetic detectors, an AMR sensor can detect the position of the magnet 60 more accurately than a Hall IC even when the distance between the magnet 60 and the arc-shaped detecting element 72 changes slightly due to an assembly error or looseness between the link coupling boss 42 and the link coupling pin 56 or the like, because a sensitivity range wider than that of the Hall IC can be set for the AMR sensor.

Figure 8:
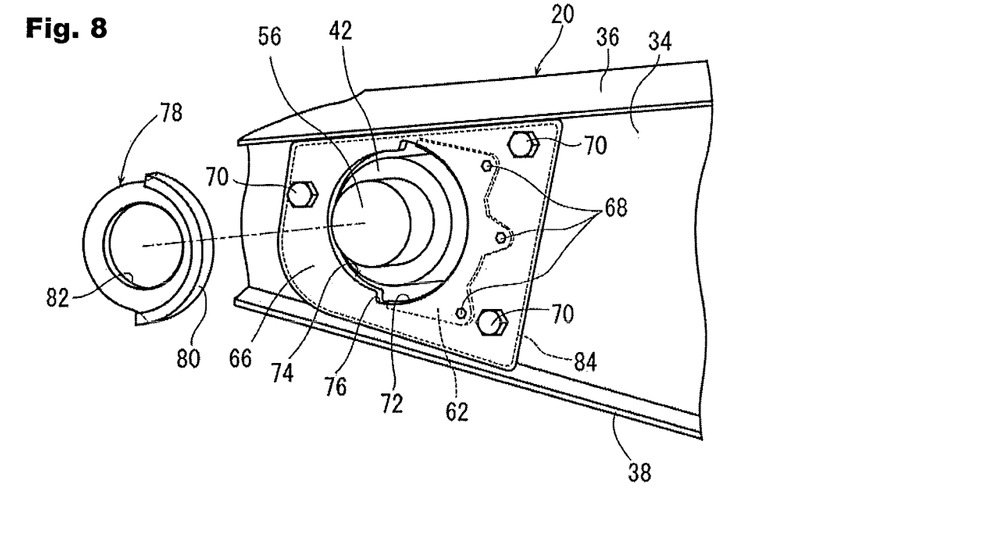
FIG. 8 is a perspective view showing a positioning jig of a magnetic detector shown in FIG. 4.
Figure 9:
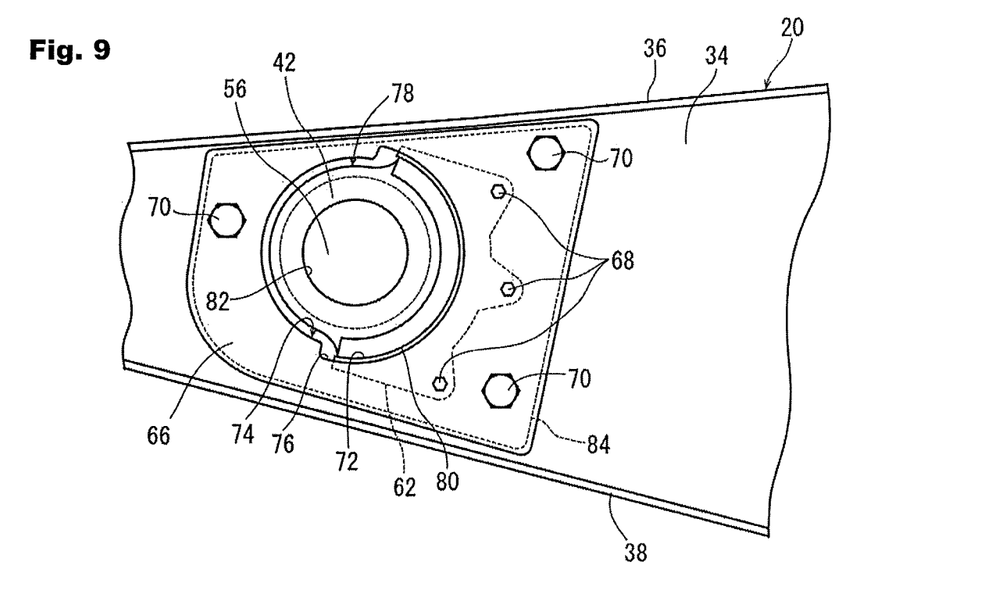
FIG. 9 is a side view showing how the magnetic detector is positioned using the jig shown in FIG. 8.

As shown in FIG. 6, a through-hole 74 is formed in the cover plate 66. An inner circumferential rim of the through-hole 74 has an arc-shaped inner circumferential rim 76 extending in the shape of an arc along the arc-shaped detecting element 72 of the magnetic detector 62. With the magnetic detector 62 being fixed to the inner surface of the cover plate 66, the arc-shaped detecting element 72 of the magnetic detector 62 preferably projects toward the inside of the through-hole 74 beyond the arc-shaped inner circumferential rim 76. Such a configuration allows an assembly worker to easily position the magnetic detector 62 by using a jig 78 shown in FIG. 8. The jig 78 is formed of a plate-like member that has an arc-shaped outer circumferential rim 80 that matches the arc-shaped detecting element 72 of the magnetic detector 62. A circular opening 82 corresponding to the outer diameter of the link coupling pin 56 is formed in the jig 78. The center of the circular opening 82 is in alignment with the arc center of the arc-shaped outer circumferential rim 80. When positioning the magnetic detector 62, the assembly worker inserts the link coupling pin 56 into the circular opening 82 of the jig 78 and the brings the arc-shaped detecting element 72 of the magnetic detector 62 into abutment with the arc-shaped outer circumferential rim 80 of the jig 78 as shown in FIG. 9. As a result, the arc center of the arc-shaped detecting element 72 aligns with the central axis line of the link coupling pin 56. Thus, while the magnet 60 moves along the arc as the left link piece 54 fixed to the link coupling pin 56 rotates, the distance between the magnet 60 and the arc-shaped detecting element 72 in relation to the radial direction of the link coupling pin 56 is kept constant. As a result, the position of the magnet 60 is detected accurately by the magnetic detector 62.

As shown in FIG. 6 and FIG. 7, the cover plate 66 is preferably provided with a rib 84 protruding widthwise inward from the outer circumferential rim of the cover plate 66 and extending along the outer circumferential rim. Such a configuration can prevent the entry of foreign matters such as earth and sand between the cover plate 66 and the left side wall 34 of the arm 20. As long as the rib 84 can prevent the entry of foreign matters of a certain size or larger that potentially damage the magnet 60 and the magnetic detector 62, there may exist a gap between the projecting end of the rib 84 and the left side wall 34 of the arm 20. In a case where such a gap exists, small foreign matters entering the through-hole 74 of the cover plate 66 and the like are discharged through the gap, preventing the accumulation of foreign matters between the cover plate 66 and the left side wall 34 of the arm 20.

The hydraulic shovel is further described with reference to FIG. 5. A circular opening 85 to which an axial end portion of the link coupling pin 56 is fixed is formed in the left link piece 54. As shown in FIG. 5, a pair of projections 86 projecting widthwise inward is disposed on the inner surface of the left link piece 54, and it is preferred that the magnet 60 is positioned between these projections 86 along the circumferential direction of the circular opening 85, i.e., the circumferential direction of the link coupling pin 56 when the link coupling pin 56 is fixed to the left link piece 54. According to such a configuration, even when foreign matters enter between the cover plate 66 and the left side wall 34 of the arm 20, the projections 86 scrape the foreign matters off the path of rotation of the magnet 60 when the magnet 60 moves along the arc as the left link piece 54 rotates, resulting in the prevention of contact between the magnet 60 and the foreign matters.

Figure 10:
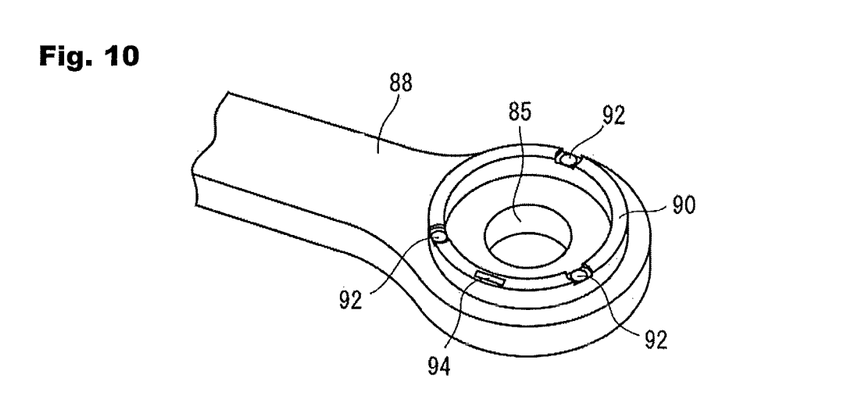
FIG. 10 is a perspective view of the left link piece according to another embodiment of the working arm device configured according to the present invention.
Figure 11:
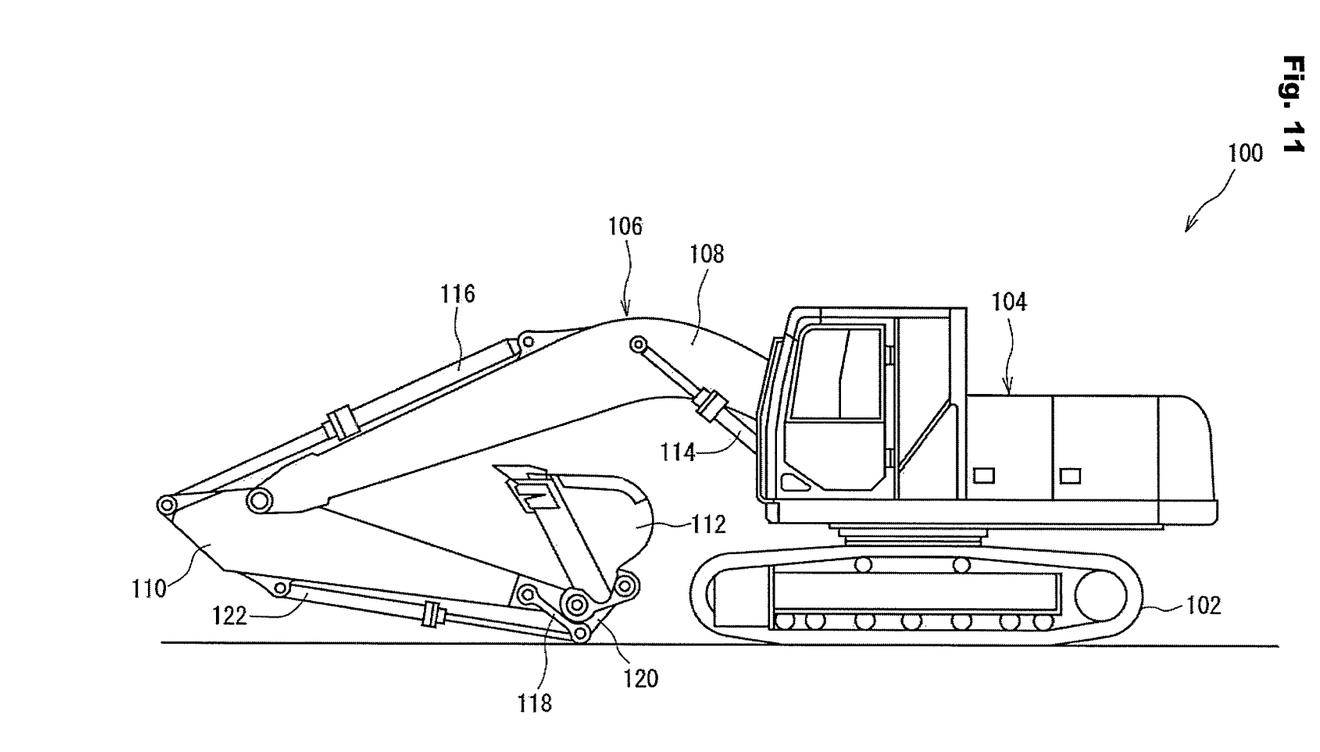
FIG. 11 is a side view of a hydraulic shovel for explaining the prior art.

FIG. 10 shows a left link piece 88 according to another embodiment of the working arm device configured according to the present invention. An annular ridge 90 projecting widthwise inward is fixed to an inner surface of the left link piece 88 by a screw 92. The radial center of the annular ridge 90 is in alignment with the center of the circular opening 85, and the radial center of the annular ridge 90 is positioned on the central axis line of the link coupling pin 56 by fixing the link coupling pin 56 to the left link piece 88. A magnet 94 is embedded in the annular ridge 90. Therefore, even when foreign matters enter between the cover plate 66 and the left side wall 34 of the arm 20, the annular ridge 90 can prevent the entry of foreign matters into the path of rotation of the magnet 94, resulting in the prevention of contact between the magnet 94 and the foreign matters.

The invention claimed is:

1. A working arm of a construction machine, comprising:
   an arm;
   a first link having a first end portion and a second end portion, the first end portion of the first link being coupled in a rotatable manner to a tip of the arm, and being located widthwise outward of a side wall of the arm along a width direction;
   a second link having a first end portion and a second end portion, the first end portion of the second link being coupled in a rotatable manner to the second end portion of the first link;
   a work tool coupled in a rotatable manner to the second end portion of the second link, and also coupled in a rotatable manner to the arm closer to the tip of the arm than the first end portion of the first link; and
   angle detection means for detecting an angle of rotation of the first link with respect to the arm, the angle detection means being disposed between an inner surface of the first link and an outer surface of the side wall of the arm along the width direction,
   wherein the angle detection means includes
      a magnet attached to one of the inner surface of the first link and the outer surface of the side wall of the arm, and
      a magnetic detector attached to the other of the inner surface of the first link and the outer surface of the side wall of the arm.

2. The working arm device of the construction machine according to claim 1,
   wherein the arm is provided with a cylindrical link coupling boss extending in the width direction and protruding from the side wall thereof, a cylindrical link coupling pin is inserted in a rotatable manner into the link coupling boss, and the first end portion of the first link is fixed to the link coupling pin, and
   the magnetic detector has an arc-shaped detecting element extending in a shape of an arc along an outer circumferential surface of the link coupling boss, the magnet being positioned between the outer circumferential surface of the link coupling boss and the arc-shaped detecting element.

3. The working arm device of the construction machine according to claim 2, wherein the magnet is fixed to the inner surface of the first link, the magnetic detector is fixed to a cover member, and the cover member is attached to the outer surface of the side wall of the arm.

4. The working arm device of the construction machine according to claim 3, wherein the cover member includes a cover plate that is disposed at a distance from the outer surface of the side wall of the arm in the width direction, and the magnetic detector is fixed to an inner surface of the cover plate.

5. The working arm device of the construction machine according to claim 4,
   wherein a through-hole is formed in the cover plate, and an inner circumferential rim of the through-hole has an arc-shaped inner circumferential rim extending in the shape of the arc along the arc-shaped detecting element of the magnetic detector, and
   with the magnetic detector being fixed to the inner surface of the cover plate, the arc-shaped detecting element of the magnetic detector projects toward the inside of the through-hole beyond the arc-shaped inner circumferential rim.

6. The working arm device of the construction machine according to claim 4, wherein the cover plate includes a rib protruding widthwise inward from an outer circumferential rim of the cover plate and extending along the outer circumferential rim.

7. The working arm device of the construction machine according to claim 3, wherein the inner surface of the first link is provided with a pair of projections projecting widthwise inward, and the magnet is positioned between the pair of projections in a circumferential direction of the link coupling pin.

8. The working arm device of the construction machine according to claim 3, wherein the inner surface of the first link is provided with an annular ridge projecting widthwise inward, and a radial center of the annular ridge is positioned on a central axis line of the link coupling pin, and the magnet is embedded in the annular ridge.

9. The working arm device of the construction machine according to claim 1, wherein the magnet is attached to the inner surface of the first link, and the magnetic detector is attached to the outer surface of the side wall of the arm.

10. The working arm device of the construction machine according to claim 1, wherein the magnet is attached to the outer surface of the side wall of the arm, and the magnetic detector is attached to the inner surface of the first link.

* * * * *